(12) United States Patent
O'Connell et al.

(10) Patent No.: US 7,796,524 B1
(45) Date of Patent: Sep. 14, 2010

(54) MONITORING QUALITY OF SERVICE IN PACKET-BASED COMMUNICATIONS

(76) Inventors: David O'Connell, 39 Bothar an tSleibhe, Moycullen, Galway (IE); Donal O'Murchu, An Cnocan Glas, An Spideal, County Galway (IE); Joseph Smyth, 14 Dun Daingean, Dangan, Galway (IE)

( * ) Notice: Subject to any disclaimer, the term of this patent is extended or adjusted under 35 U.S.C. 154(b) by 1615 days.

(21) Appl. No.: 09/680,829

(22) Filed: Oct. 6, 2000

(51) Int. Cl.
H04L 12/26 (2006.01)

(52) U.S. Cl. .................. 370/241; 370/235; 370/252

(58) Field of Classification Search .......... 370/230, 370/253, 349, 352, 252, 241, 250, 389, 235, 370/236, 395.2, 395.21, 230.1, 231, 232, 370/233, 234, 251, 410; 709/224, 226
See application file for complete search history.

(56) References Cited

U.S. PATENT DOCUMENTS

| | | | |
|---|---|---|---|
| 5,042,027 A * | 8/1991 | Takase et al. | 370/252 |
| 5,477,531 A | 12/1995 | McKee et al. | |
| 5,867,483 A * | 2/1999 | Ennis et al. | 370/252 |
| 6,018,521 A * | 1/2000 | Timbs et al. | 370/342 |
| 6,097,699 A * | 8/2000 | Chen et al. | 370/231 |
| 6,230,006 B1 * | 5/2001 | Keenan et al. | 455/424 |
| 6,363,053 B1 * | 3/2002 | Schuster et al. | 370/230 |
| 6,449,259 B1 * | 9/2002 | Allain et al. | 370/253 |
| 6,480,898 B1 * | 11/2002 | Scott et al. | 709/238 |
| 6,496,477 B1 * | 12/2002 | Perkins et al. | 370/228 |
| 6,498,783 B1 * | 12/2002 | Lin | 370/252 |
| 6,502,131 B1 * | 12/2002 | Vaid et al. | 709/224 |
| 6,574,213 B1 * | 6/2003 | Anandakumar et al. | 370/349 |
| 6,577,648 B1 * | 6/2003 | Raisanen et al. | 370/503 |
| 6,590,869 B1 * | 7/2003 | Beyda et al. | 370/248 |
| 6,647,262 B1 * | 11/2003 | Demetrescu et al. | 455/436 |
| 6,662,009 B2 * | 12/2003 | Lynn | 455/424 |
| 6,671,724 B1 * | 12/2003 | Pandya et al. | 709/226 |
| 6,674,733 B1 * | 1/2004 | Huusko | 370/329 |
| 6,704,287 B1 * | 3/2004 | Moharram | 370/242 |
| 6,728,215 B1 * | 4/2004 | Alperovich et al. | 370/252 |
| 6,816,464 B1 * | 11/2004 | Scott et al. | 370/252 |
| 6,842,427 B1 * | 1/2005 | Evslin et al. | 370/252 |
| 6,885,641 B1 * | 4/2005 | Chan et al. | 370/252 |
| 6,934,279 B1 * | 8/2005 | Sollee et al. | 370/352 |
| 6,941,551 B1 * | 9/2005 | Turkoglu | 717/174 |
| 6,996,132 B1 * | 2/2006 | Toletv | 370/517 |
| 7,123,707 B1 * | 10/2006 | Hiri et al. | 379/215.01 |
| 7,151,927 B1 * | 12/2006 | Weaver, Jr. | 455/423 |
| 7,602,710 B2 * | 10/2009 | Grippo et al. | 370/230 |
| 7,644,178 B2 * | 1/2010 | Hallenstal et al. | 709/238 |
| 2001/0031625 A1 * | 10/2001 | Lynn | 455/67.1 |
| 2002/0087370 A1 * | 7/2002 | Brueckheimer et al. | |
| 2005/0213509 A1 * | 9/2005 | Collomb et al. | 370/252 |
| 2006/0007940 A1 * | 1/2006 | Sollee et al. | 370/396 |

FOREIGN PATENT DOCUMENTS

| | | |
|---|---|---|
| EP | 0948165 A1 | 10/1999 |
| EP | 0996273 A1 | 4/2000 |

* cited by examiner

*Primary Examiner*—Chi H. Pham
*Assistant Examiner*—Kevin Mew
(74) *Attorney, Agent, or Firm*—Barnes & Thornburg LLP (57) ABSTRACT

A method of monitoring quality of service in communications over a packet-based network, involves transmitting test packets across the network and monitoring transmission characteristics such as packet loss and transmission delay for the test packets. A measure of network performance is then dynamically calculated from the transmission characteristics, and is displayed at the endpoint as a dynamic indication of the network performance.

48 Claims, 3 Drawing Sheets

MONITORING QUALITY OF SERVICE IN PACKET-BASED COMMUNICATIONS

FIELD OF THE INVENTION

The present invention relates to the monitoring of quality of service information in packet-based communications. The invention has particular application in packet-based telephony.

BACKGROUND OF THE INVENTION

Many parameters such as network and codec delay, packet loss, codec performance affect the user's perception of the quality of service (QoS) of a packet-based telephony call, as compared to an end-to end TDM telephone call.

The Nortel Networks "Meridian" Internet Telephony Gateway Trunk ("Meridian" is a Trade Mark) can measure the latency and packet loss during a telephone call using the Internet Protocol. These factors directly affect the perceived QoS and can be used to generate a measurement of network performance during a call. If the measurement of network performance drops below a predetermined value, the system can be programmed to switch the call from the switched packet network to a conventional analog network, thereby ensuring that the user has an acceptable level of call quality at all times.

However, users do not themselves currently have any way of monitoring the QoS in an objective way. Users can only give subjective reactions that the QoS has improved or declined during a call.

This contrasts to GSM or other mobile communications, in which a single parameter, i.e. the strength of signal from the local base station, provides an accurate guide to the quality of the call, or in the case of two users each on mobile handsets, the quality at each end. Thus, many handsets have a signal strength indicator which allows a user to monitor the signal strength during a call. A method of monitoring QoS for a packet-based telephony call would be attractive to users and would add value to the network or equipment provider who is supplying the QoS information.

It is therefore an object of this invention to provide a method of monitoring quality of in communications over a packet-based network.

SUMMARY OF THE INVENTION

The invention provides a method of monitoring quality of service in communications over a packet-based network between two points, at least one of which is an endpoint, comprising the steps of:
  transmitting test packets across the network and monitoring transmission characteristics of said test packets;
  dynamically calculating from said transmission characteristics a measure of network performance; and
  providing at said endpoint a dynamic indication of the network performance based on said calculation.

It has been found that by measuring a few simple transmission characteristics such as packet loss and transmission delay between endpoints, a useful measure of quality of service can be calculated and subsequently presented to a user at an endpoint, allowing the user to monitor the QoS as it varies in real time during the call. This gives the user added value for call set-up, as the QoS provided by different service providers can be compared. Alternatively, users might obtain rebates for call charges in respect of calls where the QoS was below a predefined level. It also benefits the suppliers of endpoint equipment, since a dynamic QoS monitoring feature will be attractive to customers of the equipment.

The presentation of this information can be by any useful means, such as: a green LED to indicate acceptable QoS and a red LED to indicate unacceptable QoS; a QoS indication bar on a handset or terminal display which varies in length as the QoS varies; an aural tone audible to the user when the QoS drops below a predetermined level; or a numerical display providing a numerical indication of QoS on a scale of e.g. 1-5, to give but a few examples.

An important application of the invention is in voice telephony calls made over an IP (Internet Protocol) based network such as the Internet, or over a local area network which operates in much the same way as the Internet (e.g. a local area network or LAN). This type of telephony is referred to as Voice over Internet Protocol or VoIP telephony.

In VoIP calls, the voice signals are converted into a series of discrete packets of data. The packets which include addressing information, are sent independently of one another over the network, passing through a series of nodes from source to destination. Two consecutive packets might follow entirely different routes to the destination, and if it happened that one route was more congested than the other, packets on the congested route could be delayed or lost. Accordingly each packet of data includes not only the voice signal data and the addressing information, but also sequencing information to enable the computer which receives the individual data packets to piece them back together in the correct order and recreate the original voice signal.

As packets can be lost when travelling the network or as they can be delayed (depending on the route traveled, which is not a fixed route), the percentage packet loss and the delay time of packets travelling from source to destination are the two transmission characteristics most likely to vary in real time and have a noticeable effect on the QoS.

Accordingly, in addition to the voice signal packets, the invention involves also sending a series of test packets. In one embodiment, the test packets are sent from source to destination and then returned. By measuring how many packets are not returned, a measure of percentage packet loss for these test packets can be calculated. In statistical terms this percentage packet loss will apply equally to the voice signal packets which were sent during the same time period, and thus the percentage figure for the test packets provides a measure of how many voice signal packets have been lost.

Preferably, therefore, the test packets include a first series of test packets which issue from a source location to a destination location and a second series of test packets which issue from the destination location to the source location in response to the first series of test packets, whereby the network characteristics may be monitored by comparing the first and second series of test packets.

One can regard the second series of test packets as being the first series "bounced back" from the destination, or as being new packets generated by the destination location; the difference is not material to the invention.

A measure of packet loss is obtained by comparing the packets issued from the source location and the packets received back at the source location.

The first series of test packets will preferably include local source timestamp information and the second series of test packets will preferably include local destination timestamp information, the difference between the source and destination timestamp information being used to calculate a delay characteristic of the network.

This delay characteristic is preferably the absolute delay in echo-free connections (Ta) between the source and destination locations over the network.

Technology is currently in place to generate synchronised timestamps on individual data packets at different locations within the network. The Internet Engineering Task Force (IETF) has an approved method of gaining accurate time stamp information from a centralised time server on a network (IETF Network Time Protocol—RFC 1305). Data packets can be issued from a source location with local source timestamp information, and sent between nodes on the network at regular intervals. On receipt by a node they are immediately bounced back to the originator with local timestamp information added. This allows the value of Ta to be calculated.

Voice quality on a packet network is dependent on a large number of factors, a list of which is given in ITU-T Recommendation G.107 version 05/00 (issued by the Telecommunication Standardization Sector of the International Telecommunication Union). No one factor exclusively determines voice quality—it is the combined effect of these factors that determines the overall voice quality.

The invention takes advantage of the fact that those factors which vary in a real-time way are largely dependent on a few simple transmission characteristics of packets travelling between the two parties.

ITU-T Recommendation G.107 provides a computational model, the E-Model, to determine the combined effect of various parameters on voice quality. The model evaluates the end-to-end network transmission performance and outputs a scalar rating "R" for the network transmission quality. The model further correlates the network objective measure, "R", with the subjective QoS metric for voice quality, MOS. The MOS or Mean Opinion Score is a subjective measurement of voice quality, and ranges from 1 to 5, where 1 is bad voice quality and 5 is excellent.

The value of R depends on a wide range of factors: Sending Loudness Rating; Receiving Loudness Rating; Sidetone Masking Rating; Listener Sidetone Rating; D-Value of Telephone, Send Side; D-Value of Telephone Receive Side; Talker Echo Loudness Rating; Weighted Echo Path Loss; Mean one-way Delay of the Echo Path; Round Trip Delay in a 4-wire Loop; Absolute Delay in echo-free Connections; Number of Quantization Distortion Units; Equipment Impairment Factor; Circuit Noise referred to 0 dBr-point; Noise Floor at the Receive Side; Room Noise at the Send Side; Room Noise at the Receive Side; and Advantage Factor. All of these factors are detailed more clearly in the ITU-T Recommendation G.107, and are used to calculate R.

Recommendation G.107 provides the following general formula for R:

$$R = Ro - Is - Id - Ie + A$$

Ro is the basic signal-to-noise ratio, including noise sources such as circuit noise and room noise. Is is a combination of all impairments which occur more or less simultaneously with the voice signal. Id represents the impairments caused by delay. The term Ro and the Is and Id values are subdivided into further specific impairment values. The Recommendation give the formulae used in the E-model to generate Ro, Is, Id, based on the wide range of factors listed above.

The equipment impairment factor Ie represents impairments caused by low bit rate codecs and packet losses over the network, and is discussed below.

The advantage factor A allows for compensation of impairment factors when there are other advantages of access to the user. A user on a conventional wirebound call can expect higher clarity of signal than a user on a satellite call in a remote uninhabited location, for example. This means that the satellite user is prepared to put up with a lower QoS than the wirebound user. Because the E model is intended to be used to correlate the network objective measure, R, with a subjective MOS score, R is weighted by the advantage factor to take into account this psychological expectation factor or advantage factor A.

Examples given for maximum values of A are:

Conventional (wirebound) telephony, A=0; the advantage of mobility by cellular networks in a building gives A=5; the advantage of mobility in a geographical area or moving in a vehicle gives A=10; the advantage of access to hard-to-reach locations, e.g. via multi-hop satellite connections gives A=20. These values are provisional only.

Deriving Ie in Real-Time from Packet Loss and the Codec Type:

In a packet based network, such as an IP Network, the equipment impairment factor (Ie) is specifically related to the communications codec type chosen for the call and the packet loss incurred across the network. Packet loss can be incurred due to network congestion or equipment out of service and subsequent failover. By empirical measurement of MOS scores (i.e. the users' perception of quality of service for different percentage packet loss values, all other factors being equal) under test conditions for specific test induced packet loss or otherwise it is possible to tabulate the Ie for percentage packet loss criteria for the codec types used by the equipment. These tables may then be used in real-time to derive a value for Ie based on the real-time measurement of packet loss in the network and for the codec type in use at that time.

The factor Id was mentioned above as representing the impairments caused by delay. It is composed of impairments due to Talker Echo (Idte), impairments due to Listener Echo (Idle), and impairments caused by too-long absolute delay Ta, which occur even with perfect echo cancelling (Idd). Idd is the factor which is most important in terms of variations during a call which have a significant effect on QoS.

Deriving Idd in Real-Time:

For packet based networks, such as an IP network, the Absolute Delay in echo-free Connections (Ta) is specifically related to the impairments represented by the factor Idd. Ta can vary in real-time due to the dynamic nature of packet based networks, which allow multiple routes between destinations and each packet may be routed via different physically equipment depending on various network factors such as instantaneous load or equipment out of service.

To measure Idd, bursts of packets containing timestamp information gained from a centralised time server, using protocols such as the IETF Network Time Protocol—RFC 1305, are exchanged between nodes on the network at regular intervals. On receipt by a node they are immediately bounced back to the originator with local timestamp information added, and from the two timestamps, the absolute delay in echo-free connections (Ta) is calculated. These same packets are also used to detect lost packets as described above.

The delay impairment factor (Idd) is given by the formulae:

(i) for Ta<100 ms,

Idd=0; and (ii) for Ta=>100 ms, $$Idd = 25 * ((1+X^6)^{1/6} - 3 * (1+(X/3)^6)^{1/6} + 2)$$

Where $X = (\log(Ta/100))/\log(2)$

Derivation of R from Ie and Idd

From the formula given above for R:

$$R = Ro - Is - Id - Ie + A$$

a real-time value for R can be derived if assumptions are made that Ro, Is and A have fixed values, and that the components Idte and Idle are also fixed for the duration of a call.

Recommendation G.107 gives default values for all of the factors mentioned in the Recommendation, but these defaults can be varied to take account of equipment-specific, network-specific, or environment-specific parameters. Using the default values given, one arrives at a figure of R=93.2, indicating very high voice quality.

We have found that for a VoIP implementation over a Wide Area Network (WAN) using the Nortel Networks Meridian Integrated IP Telephony Gateway product family, the generalised formula for R can be replaced by:

$$R=Y-(Ie+Idd)$$

with a value of Y=94.5 which is the laboratory measured figure for all the non-realtime varying parameters.

The constant Y is higher than the default of R=93.2, but is adjusted downwards by the combined effects of packet loss and absolute delay. Different equipment may result in a different value being chosen for the constant other than 94.5.

The value of Y is preferably from about 92 to about 98, more preferably from about 93 to about 96.

Calculation of MOS Score from R

Since R is an objective rather than a subjective measure of QoS, the calculated value of R is preferably correlated to a subjective metric for the quality of service, and an indication of this subjective value is provided to the user. Recommendation G.107 provides a formula for deriving the subjective Mean Opinion Score (MOS) from the R value:

$$MOS=1+0.035R+R(R-60)(100-R)(7\times10^{-6})$$

The value of R should first be checked to ensure it is in the range 1 to 100. If R is less than zero, MOS is set at 1 and if R is greater than 100, MOS is set at 4.5.

The MOS scale lies from 1 to 5, but scores below 2 or 3 may effectively indicate QoS so low as to be unacceptable. Accordingly, MOS scores in the range e.g. 2.5 to 5 can be normalised in the method of the invention to a more useful indication. An example might be to emit a warning tone or illuminate a warning LED on the handset if the MOS drops below 3, for example. Alternatively, the calculated MOS scores can be normalised so that values indicating acceptable call quality (e.g. from 2.5 or 3 to 4.5 or 5) are expanded out to a five or ten point scale.

The method of the invention may also include the step of providing, at the request of a user, an indication of one or more of said transmission characteristics.

This user request may be made by means of an input device associated with the endpoint and the indication may be provided by means of a display device associated with the endpoint.

For example, the endpoint may be a computer terminal having a microphone and speaker associated with it, which acts as a telephone when the required software is running on the computer. In such cases, a menu could be provided for the user to call up individual transmission characteristics such as percentage packet loss (current or historical) and absolute one-way delay times from endpoint to endpoint (or if the other endpoint is connected to the packet-based network by means of a conventional PSTN and a gateway, the delay point time from the user's endpoint to the gateway at the other end of the call).

Other parameters available to the endpoint could also be called up by the menu, such as the codec being used. The output device could be the computer VDU.

Alternatively, the endpoint might be an ethernet telephony set which connects directly to the network, in which case, the input device could be the telephony set keypad, and the display device an LCD display on the handset.

The method may also include the step of logging the network transmission characteristics, or of logging the results of the calculations of network performance.

Optionally, the logging might occur only when the results are within a predetermined range. An example might be a system which monitors the network performance, displays a red light or emits a warning beep when the QoS drops below an acceptable level, and records this event in a log. The user might then be able to obtain a rebate for the call, or for part of the call charge.

The logging could also include logging an occurrence of a communications connection over the network being lost, i.e. if a call has been dropped as a result of a deterioration in network performance.

The method of the invention can also include adjusting a billing record for the user in dependence on the results of said calculation. Thus, the service provider might automatically adjust charges for the user based on a below-acceptable level of QoS.

In a further aspect the invention provides a computer program which when executed causes a computer associated with the endpoint to:

monitor transmission characteristics of test packets transmitted across the network;

dynamically calculate from the transmission characteristics a measure of network performance; and provide the user with a dynamic indication of the network performance based on the calculation.

The computer program can operate the method of the invention as detailed above, and can also be responsible for aspects of billing and logging.

The invention further provides a telephone handset for connection to a packet-based network, having a display device for displaying a dynamic indication of network performance based on the transmission characteristics of test packets transmitted across a network to which the handset is attached.

The handset will preferably further include a processor for calculating a measure of network performance based on the transmission characteristics of test packets transmitted by the handset across the network.

In a further aspect the invention provides a system for monitoring quality of service in communications over a packet-based network, comprising:

a source endpoint connected to the network via which a user may transmit communication signals over the network;

a test packet generator for transmitting test packets across the network a test packet receiver for receiving test packets from the network;

a processor for measuring transmission characteristics of the test packets and for calculating from said transmission characteristics a measure of network performance; and an output device associated with the endpoint for providing a dynamic indication of the network performance based on said calculation.

Preferably, the test packet generator includes a timestamp generator for adding a local source timestamp to the test packets.

Further, preferably, the system includes a destination endpoint with which the source endpoint is in communication over the network, the destination endpoint having associated therewith: a test packet receiver for receiving test packets from the network; a timestamp generator for adding a local destination timestamp to the received test packets; and a test packet re-transmitter for re-transmitting the received test packets with the local destination timestamp back to their source.

The system may also include a centralised time server in communication with the network for generating a standardised time and providing this to the source and destination endpoints.

BRIEF DESCRIPTION OF DRAWINGS

The invention will now be illustrated by the following descriptions of embodiments thereof given by way of example only with reference to the accompanying drawings, in which.

DETAILED DESCRIPTION OF PREFERRED EMBODIMENTS

Figure 1:
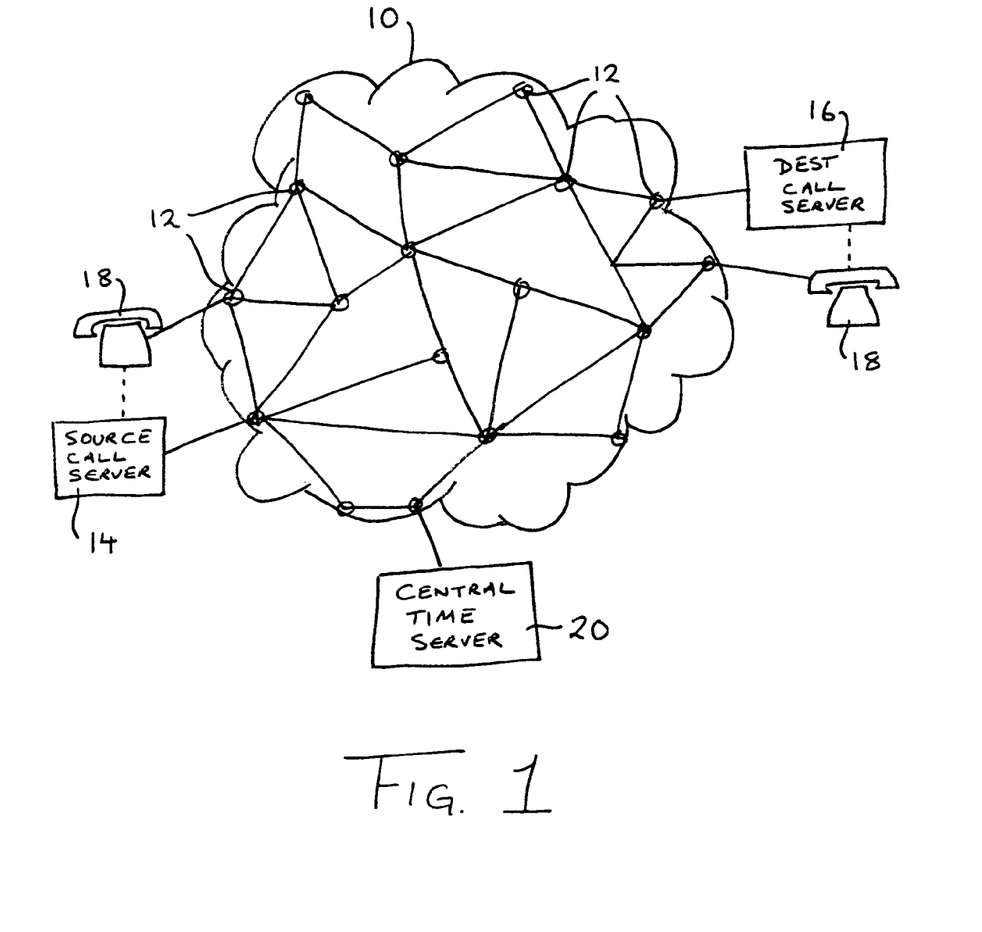
FIG. 1 is an architecture of a system according to the invention.

FIG. 1 shows a packet-based network 10, comprising a number of inter-connected nodes 12. The network may be the Internet, or it may be any other packet-based network. A pair of call servers 14, 16 are connected to nodes 12 of the network. Each call server has a number of terminals or handsets 18 associated with it, from which users may make telephone calls over the network. The handsets 18 are connected directly to nodes 12 of the network and are logically connected to the respective call servers 14,16. In FIG. 1 only a single handset 18 is shown for each call server, and the logical connection is denoted by a dotted line. For convenience, server 14 is referred to as the source call server, and server 16 as the destination call server.

The servers and handsets may be replaced by computers connected to the network having associated ethernet handsets.

The computers could also be used for video-conferencing or other network-based communications, to which the invention would be equally applicable.

Also connected to the network 10 is a centralised time server 20, which enables both servers 14,16 to generate synchronised timestamps, in accordance with IETF Network Time Protocol RFC 1305.

Figure 2:
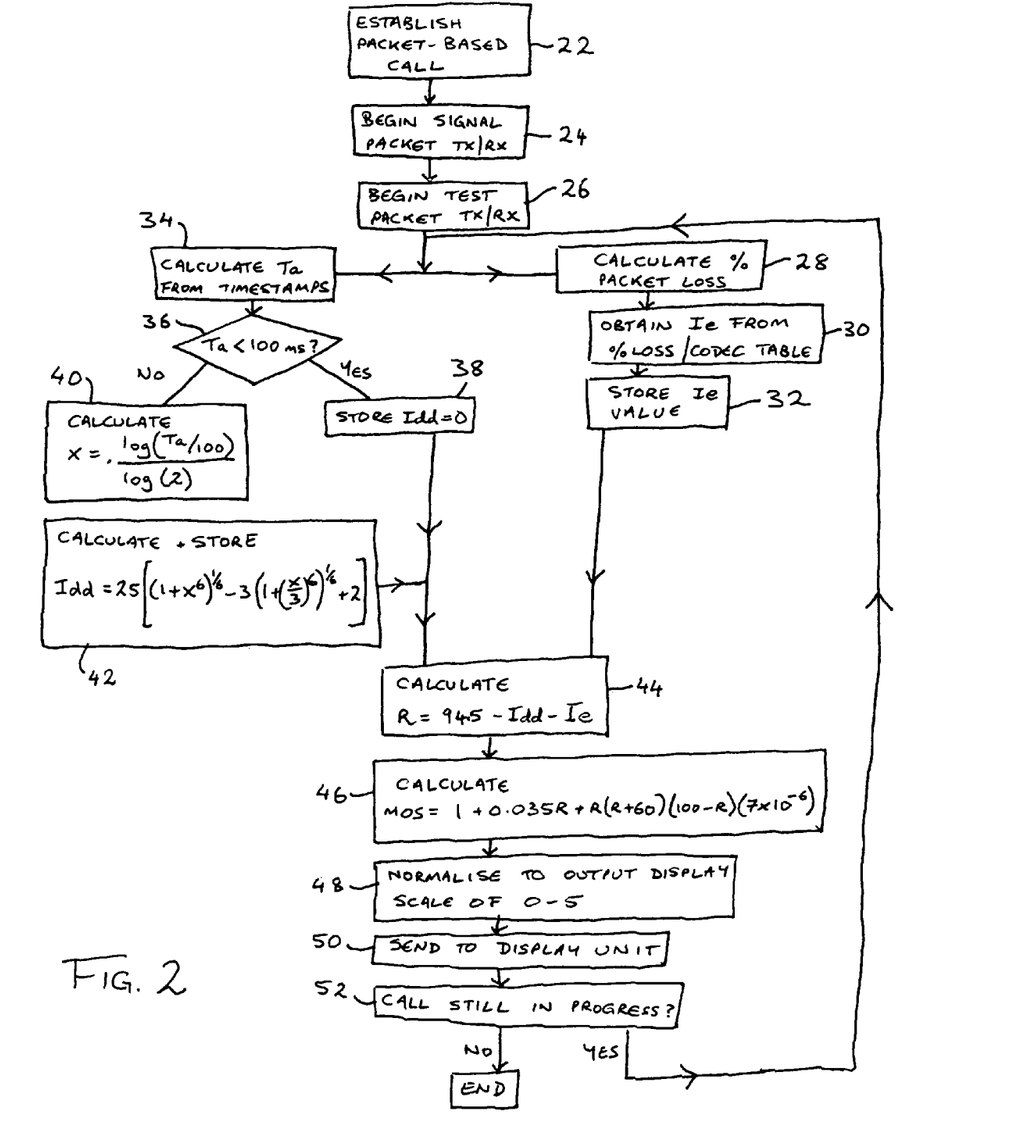
FIG. 2 is a flowchart illustrating the steps carried out in a preferred embodiment of the method of the invention.

Referring additionally to FIG. 2, when a VoIP call is made between the two handsets 18 (step 22), both handsets begin the transmission and receipt of signal packets, in the normal way, step 24. The source server 14 also begins transmission and receipt of test packets, step 26. The destination server could also begin its own transmission of test packets. (The test packets could instead be transmitted directly to or from the handsets, if the handsets are provided with the necessary functionality to generate such test packets.)

The test packets include source and destination header information allowing them to be routed to the destination server by the intervening nodes in the network, and returned back to the source. The test packets also contain timestamp information indicating the time of transmission from the source, as synchronised with time server 20. When the destination server receives a test packet it timestamps it with the time of receipt at the destination server 16, and re-routes it with this additional information back to the source.

The source call server 14 monitors the percentage of packets returned in this way, and derives a percentage value for packets lost, step 28. Controlling software running on the server 14 then correlates this percentage with the codec being used for the call in a correlation table (step 30) and reads from this table a value for the equipment impairment factor Ie. This table will be stored on the server, and the table will have been calibrated beforehand under test conditions to provide the correct Ie value for all of the codecs used by the server in making calls.

The Ie value is then stored for later calculations, step 32.

When the test packets are received back with the destination time stamp information, step 26, the software on the server makes a parallel calculation of the average one-way total transmission delay (Ta) for the packets received back during a short period of time, step 34.

The value of Ta is then examined to see if it is less than 100 ms, step 36. If so, then the variable Idd is set at zero, step 38, to reflect the fact that the algorithm delay times of less than 100 ms as being acceptable for high-quality voice calls.

If Ta is equal to or greater than zero, then a value for Idd is calculated according to the formulae:

$$Idd=25*((1+X^6)^{1/6}-3*(1+(X/3)^6)^{1/6}+2)$$

Where $X=(\log(Ta/100))/\log(2)$

These formulae are calculated in reverse order, naturally, with X being determined in step 40 and Idd in step 42.

The stored values of Ie and Idd are then used to calculate R (step 44) according to the formula:

$$R=Y-Idd-Ie,$$

with Y set at a value of 94.5 (a value previously obtained during testing for a Nortel Networks Meridian IP Telephony Gateway conducting VoIP calls). Different equipment set-ups might use different values for Y.

The value thus derived for R is converted to more subjective MOS score (step 46) according to the formula:

$$MOS=1+0.035R+R(R-60)(100-R)(7\times10^{-6})$$

(Optionally, in accordance with Recommendation G.107, the value of R can first be filtered to check if it is in the range 1 to 100. If R is less than zero, MOS is set at 1 and if R is greater than 100, MOS is set at 4.5. In practice, this step may be unnecessary, since the R values for any useful figures of packet loss and delay will always be in the range of zero to 100).

The MOS scale lies from 1 to 5, but scores below 2 or 3 may effectively indicate QoS so low as to be unacceptable. Accordingly, MOS scores in the range e.g. 2.5 to 5 can be normalised (step 48) to a zero to 5 point scale for display purposes. MOS scores of 2.5 or less are normalised to zero, and higher scores are converted according to the following table:

| CALCULATED MOS SCORE | NORMALISED DISPLAY VALUE |
| --- | --- |
| 2.5-3.0 | 1 |
| 3.0-3.5 | 2 |
| 3.5-4.0 | 3 |
| 4.0-4.5 | 4 |
| 4.5-5.0 | 5 |

Figure 3:
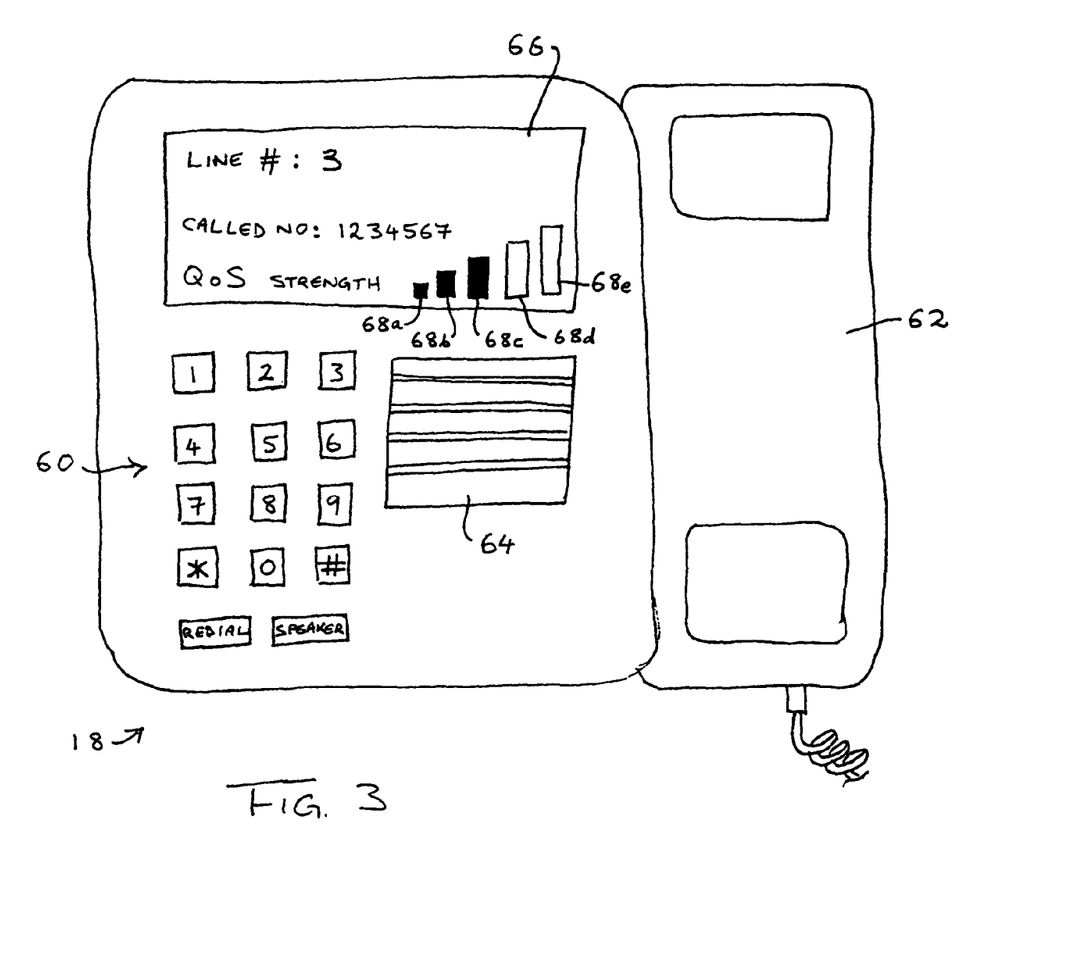
FIG. 3 is a schematic view of a handset according to the invention.

The display values are then output to a display unit (step 50) on the handsets 18, an example of which is shown in FIG. 3. The handset includes a conventional keypad array 60 and a cradle 62 for a conventional handheld unit (not shown) incorporating earpiece and mouthpiece. The handset also includes a built-in loudspeaker 64 and a display unit 66.

Display unit 66 displays information relating to the call, such as internal line number and dialed number (or the number of the calling party, if the call was received rather than initiated from the handset shown). The display unit further shows a series of five indicator bars 68a-68e to indicate the QoS display value as calculated in the method of FIG. 2. This is shown as "QoS strength" which in fact is a measure of the system parameters as predetermined by the constant value of 94.5, and more particularly of the dynamic variations from the optimum QoS due to packet losses and transmission delays.

In the handset shown in FIG. 3, indicator bars 68a-68c are darkened to indicate a display value of 3, corresponding to a MOS value of 3.5-4.0, which is a relatively high quality voice signal.

Returning to FIG. 2, the software enters a continuous loop by checking whether the call is still active (step 52), and if so, returning to steps 28 and 34 for further updating of the display value in the light of current delays and packet losses.

The invention is not limited to the embodiments described herein which may be varied without departing from the spirit of the invention.

What is claimed is:

1. A method of monitoring quality of service in telephony communications over a packet-based network between two points, at least one of which is an endpoint, wherein said endpoint is a telephony device having an interface which is accessible to a user to enable said user to participate in a telephony session over the network;

said telephony device further having an output for presenting information to said user;

the method comprising the steps of:

transmitting test packets across the network while a telephony session including said telephony device is in progress and monitoring transmission characteristics of said test packets, said test packets including a first series of test packets which issue from a source location to a destination location and a second series of test packets which issue from said destination location to said source location in response to said first series of test packets;

dynamically calculating from said transmission characteristics a measure of network performance comprising a measure of packet loss by comparing the packets issued from the source location and the packets received back at the source location, using the measure of packet loss and the identity of the communications codec being employed by the endpoint to calculate an equipment impairment factor (Ie); and providing at said output of said telephony device a dynamic indication of said equipment impairment factor (Ie) during said telephony session.

2. A method according to claim 1, wherein said transmission characteristics are selected from packet loss, transmission delay, and a combination thereof.

3. A method according to claim 2, wherein said transmission characteristics include both packet loss and transmission delay.

4. A method according to claim 1, wherein the indication of the network performance is provided by means of a visual display associated with the endpoint.

5. A method according to claim 1, wherein the indication of the network performance is provided by means of an aural signal provided to the endpoint.

6. A method according to claim 5, wherein the aural indication of the network performance is provided as a discrete signal emitted at the endpoint when the value of the metric passes a predetermined point.

7. A method according to claim 1, wherein the first series of test packets include local source timestamp information and wherein the second series of test packets include local destination timestamp information, the difference between said local source timestamp information and local destination timestamp information being used to calculate a delay characteristic of the network.

8. A method according to claim 7, wherein the delay characteristic is the absolute delay in echo-free connections (Ta) between the source and destination locations over the network.

9. A method according to claim 1, wherein the calculation of Ie is made by looking up the measured packet loss in a stored table which correlates values of Ie with packet loss values for the codec being used.

10. A method according to claim 1, wherein the calculated value of Ta is used to calculate a delay impairment factor.

11. A method according to claim 10, wherein the delay impairment factor (Idd) is given by the formulae:

(i) for Ta<100 ms,

Idd=0; and (ii) for Ta=>100 ms, $$Idd=25*((1+X^6)^{1/6}-3*(1+(X/3)^6)^{1/6}+2)$$

Where $X=(\log(Ta/100))/\log(2)$.

12. A method according to claim 11, wherein a transmission rating factor R is calculated from the formula R=Y−Idd−Ie, where Y is a constant which has been predetermined for the network and the equipment being used on the network, and wherein Ie is an equipment impairment factor calculated from the measure of packet loss and the identity of the communications codec being employed by the endpoint.

13. A method according to claim 12, wherein the calculation of Ie is made by looking up the measured packet loss in a stored table which correlates values of Ie with packet loss values for the codec being used.

14. A method according to claim 13, wherein the value of Y is from about 92 to about 97.

15. A method according to claim 14, wherein the value of Y is from about 93 to about 95.

16. A method according to claim 15, wherein the value of Y is about 94.5.

17. A method according to claim 12, wherein the calculated value of R is correlated to a subjective metric for the quality of service, and wherein an indication of the value of said subjective metric is provided at the endpoint to a user.

18. A method according to claim 17, wherein said metric is a mean opinion score (MOS) and is calculated according to the formula:

$$MOS=1+0.035R+R(R-60)(100-R)(7\times10-6).$$

19. A method according to claim 18, wherein said MOS is further adjusted before being provided as an indication at the endpoint, by normalising acceptable values of MOS to a different scale.

20. A method according to claim 17, wherein the indication of the value of the subjective metric is provided by means of a visual display associated with the endpoint.

21. A method according to claim 17, wherein the indication of the value of the subjective metric is provided by means of an aural signal provided to the endpoint.

22. A method according to claim 21, wherein the aural indication is provided as a discrete signal emitted at the endpoint when the value of the metric passes a predetermined point.

23. A method according to claim 1, wherein the step of providing a dynamic indication of the network performance includes providing, at the request of a user, an indication of one or more of said transmission characteristics.

24. A method according to claim 23, wherein the request of the user is made by means of an input device associated with the endpoint and the indication is provided by means of a display device associated with the endpoint.

25. A method according to claim 1, further comprising the step of logging the network transmission characteristics.

26. A method according to claim 1, further comprising the step of logging the results of said calculation.

27. A method according to claim 26, wherein the step of logging the results of said calculation occurs only when said results are within a predetermined range.

28. A method of monitoring quality of service in telephony communications over a packet-based network between two points, at least one of which is an endpoint,
    wherein said endpoint is a telephony device having an interface which is accessible to a user to enable said user to participate in a telephony session over the network;
    said telephony device further having an output for presenting information to said user;
the method comprising the steps of:
    transmitting test packets across the network while a telephony session including said telephony device is in progress and monitoring transmission characteristics of said test packets;
    dynamically calculating from said transmission characteristics a measure of network performance;
    providing at said output of said telephony device a dynamic indication of the network performance based on said calculation during said telephony session; and
    logging the results of said calculation including logging the fact that a communications connection over the network has been lost.

29. A method according to claim 1, further comprising the step of adjusting a billing record for a user in dependence on the results of said calculation.

30. A non-transitory computer-readable medium encoded with a data structure or computer program to perform a method which, when executed on a processor associated with an endpoint connected to a packet-based network, said endpoint being a telephony device having an interface which is accessible to a user to enable said user to participate in a telephony session over said network, said telephony device further having an output for presenting information to said user, cause said processor to:
    monitor transmission characteristics of test packets transmitted across the network while a telephony session including said telecommunications device is in progress;
    dynamically calculate from said transmission characteristics a measure of network performance;
    provide to said user at said output of said endpoint a dynamic indication of the network performance based on said calculation during said telephony session; and
    logging the results of said calculation including logging the fact that a communications connection over the network has been lost.

31. A non-transitory computer-readable medium according to claim 30, wherein said transmission characteristics are selected from packet loss, transmission delay, and a combination thereof.

32. A non-transitory computer-readable medium according to claim 31, wherein the transmission characteristics include the absolute delay in echo-free connections (Ta) between source and destination locations over the network, obtained by comparing local timestamp information from source and destination locations on the network and a measure of packet loss obtained by comparing the packets issued from the source location and the packets received back at the source location.

33. A non-transitory computer-readable medium according to claim 32, wherein the measure of packet loss and the identity of the communications codec being employed by the endpoint are used to calculate an equipment impairment factor (Ie).

34. A non-transitory computer-readable medium according to claim 33, wherein a delay impairment factor (Idd) is given by the formulae:
    (i) for Ta<100 ms,
        Idd=0; and
    (ii) for Ta=>100 ms, $$Idd = 25*((1+X^6)^{1/6} - 3*(1+(X/3)^6)^{1/6} + 2)$$

Where $X=(\log(Ta/100))/\log(2)$.

35. A non-transitory computer-readable medium according to claim 34, wherein a transmission rating factor R is calculated from the formula R=Y−Idd−Ie, where Y is a constant which has been predetermined for the network and the equipment being used on the network, and wherein Ie is an equipment impairment factor calculated from the measure of packet loss and the identity of the communications codec being employed by the endpoint.

36. A non-transitory computer-readable medium according to claim 35, wherein the value of Y is from about 92 to about 97.

37. A non-transitory computer-readable medium according to claim 36, wherein the value of Y is from about 93 to about 95.

38. A non-transitory computer-readable medium according to claim 37, wherein the value of Y is about 94.5.

39. A non-transitory computer-readable medium according to claim 35, wherein the calculated value of R is correlated to a subjective metric for the quality of service, and wherein an indication of the value of said subjective metric is provided at the endpoint to a user.

40. A non-transitory computer-readable medium according to claim 30, wherein provision of a dynamic indication of the network performance includes providing, at the request of a user, an indication of one or more of said transmission characteristics.

41. A non-transitory computer-readable medium according to claim 30, further comprising instructions which when executed cause a computer to log the network transmission characteristics.

42. A non-transitory computer-readable medium according to claim 30, further comprising instructions which when executed cause a computer to log the results of said calculation.

43. A non-transitory computer-readable medium according to claim 30, further comprising instructions which when executed cause a computer to adjust a billing record for the a in dependence on the results of said calculation.

44. A system for monitoring quality of service in communications over a packet-based network, comprising:

a source endpoint connected to the network via which a user may transmit communication signals as part of a telephony session over the network wherein said source endpoint is a telephony device having an interface which is accessible to a user to enable said user to participate in a telephony session over the network;

a test packet generator for transmitting a first series of test packets across the network during said telephony session a test packet receiver for receiving a second series of test packets from the network during said telephony session in response to said first series of test packets;

a processor for measuring transmission characteristics of said test packets and for calculating from said transmission characteristics a measure of network performance comprising a measure of packet loss by comparing the packets issued from the source location and the packets received back at the source location, and for using the measure of packet loss and the identity of the communications codec being employed by the endpoint to calculate an equipment impairment factor (Ie); and an output associated with said telecommunications device for providing a dynamic indication of said equipment impairment factor (Ie) to said user during said telephony session.

45. A system according to claim 44, wherein said test packet generator includes a timestamp generator for adding a local source timestamp to said test packets.

46. A system according to claim 45, further comprising a destination endpoint with which said source endpoint is in communication over the network, said destination endpoint having associated therewith: a test packet receiver for receiving test packets from the network; a timestamp generator for adding a local destination timestamp to said received test packets; and a test packet re-transmitter for re-transmitting said received test packets with said local destination timestamp back to their source.

47. A system according to claim 46, further comprising a centralized time server in communication with the network for generating a standardized time and providing same to said source and destination endpoints.

48. A method of monitoring quality of service in communications over a packet-based network between two points, at least one of which is an endpoint, comprising the steps of:

transmitting a first series of test packets location across the network from a source location to a destination, said first series of test packets including local source timestamp information;

transmitting a second series of test packets location across the network from said destination to said source location in response to the first series, said second series of test packets including local destination timestamp information;

measuring the difference between said local source timestamp information and local destination timestamp information; and calculating from said measured difference the absolute delay in echo-free connections (Ta) between the source and destination locations over the network and thereby calculating a delay impairment factor;

providing at said endpoint a dynamic indication of the network performance based on said delay impairment factor.

* * * * *